(12) United States Patent
Harris et al.

(10) Patent No.: US 8,124,571 B2
(45) Date of Patent: Feb. 28, 2012

(54) PROCESS FOR TREATING AN UNDERGROUND FORMATION

(75) Inventors: Ralph Edmund Harris, Guildford (GB); Ian Donald McKay, Guildford (GB)

(73) Assignee: Cleansorb Limited, Guilford, Surrey (GB)

( * ) Notice: Subject to any disclaimer, the term of this patent is extended or adjusted under 35 U.S.C. 154(b) by 594 days.

(21) Appl. No.: 11/664,533

(22) PCT Filed: Oct. 6, 2005

(86) PCT No.: PCT/GB2005/003853
§ 371 (c)(1), (2), (4) Date: Jun. 29, 2007

(87) PCT Pub. No.: WO2006/038016
PCT Pub. Date: Apr. 13, 2006

(65) Prior Publication Data
US 2008/0108519 A1 May 8, 2008

(30) Foreign Application Priority Data
Oct. 6, 2004 (GB) .................................. 0422191.7

(51) Int. Cl.
C09K 8/74 (2006.01)
C09K 8/16 (2006.01)
E21B 33/13 (2006.01)

(52) U.S. Cl. ......... 507/269; 507/141; 507/142; 166/293

(58) Field of Classification Search .................. 507/141, 507/142, 143, 270, 269; 166/288, 293
See application file for complete search history.

(56) References Cited

U.S. PATENT DOCUMENTS

| 2,990,881 | A | * | 7/1961 | Nathan et al. ................. 166/292 |
| 3,146,828 | A | | 9/1964 | Mann |
| 3,593,796 | A | * | 7/1971 | Stainback et al. ............ 166/288 |
| 3,885,065 | A | | 5/1975 | Suman, Jr. et al. |
| 5,604,185 | A | * | 2/1997 | Hen .............................. 507/119 |
| 5,730,873 | A | * | 3/1998 | Hapka et al. .................. 210/632 |
| 6,401,819 | B1 | | 6/2002 | Harris et al. |

FOREIGN PATENT DOCUMENTS

GB 852 769 11/1960

OTHER PUBLICATIONS

Journal of Material Chemistry, 1997,7(9), 1677-1692 , Bermudez et al.*
International Search Report for PCT/GB2005/003853 mailed Jan. 27, 2006.

* cited by examiner

Primary Examiner — Timothy J. Kugel
Assistant Examiner — Aiqun Li
(74) Attorney, Agent, or Firm — Nixon & Vanderhye P.C.

(57) ABSTRACT

An underground formation is consolidated by (a) incorporating into a treatment fluid (i) at least one chemical substance which is capable of undergoing a chemical change that alters the physico-chemical environment of the treatment fluid and which is a bicarbonate or a compound that generates a phosphate, phosphoric acid, sulphate, sulphuric acid, hydrogen sulphide, $S^{2-}$, carbon dioxide, bicarbonate, base or acid; and, optionally, (ii) at least one additional chemical substance selected from salts and complexes of metals having a valency of 2 or higher; introducing the treatment fluid into the formation; and allowing the chemical substance (i), alone or in combination with the optional chemical substance (ii), to undergo a chemical change that alters the physico-chemical environment of the treatment fluid such that a consolidating mineral is deposited in the underground formation.

17 Claims, No Drawings

PROCESS FOR TREATING AN UNDERGROUND FORMATION

This application is the U.S. national phase of International Application No. PCT/GB2005/003853 filed 6 Oct. 2005, which designated the U.S. and claims priority to GB 0422191.7 filed 6 Oct. 2004, the entire contents of each of which are hereby incorporated by reference.

A large proportion of hydrocarbon production worldwide is from underground sandstone formations. These formations often have a high porosity and permeability so have the potential to produce hydrocarbons at high rates. Frequently however, such formations have a tendency to produce sand, due to being unconsolidated or poorly consolidated. Sand producing formations generally are relatively young in the sense of geological time and are often composed of loosely attached sand or sediments that have not yet been converted to solid sandstone by geochemical processes.

Sand as used herein refers to fine particulate materials that may be produced from poorly consolidated sandstones. Normally these will be sand grains.

Poorly consolidated sandstones have been defined in U.S. Pat. No. 3,741,308 (cited herein only for the purpose of illustration and not for limiting the scope of the present invention) as follows: any assemblage of particulate matter provided: 1. Particles in the 50 to 2000 micron size range account for at least 10 percent of the weight of the entire assemblage. 2. At least about 20 percent by weight of the entire assemblage consists of minerals or compounds containing the element silicon as part of their chemical composition, and 3. The assemblage is either unconsolidated or so poorly consolidated that it behaves as an unconsolidated particulate system under stresses to which it is exposed.

Factors that can cause sand production in weak formations include producing drawdown, pressure depletion, in-situ rock stresses, changes in flow rate or changes in water cut (sand production is often associated with water breakthrough). While a certain amount of sand production can be tolerated, excessive sand production can cause a variety of operational problems including erosion of pumps, tubing, chokes, valves and pipe bends. This can lead to serious safety and environmental consequences (U.S. Pat. No. 3,741,308). It can also lead to collapse of formation or casing and significant reduction in or loss of production.

The tendency of the formation to produce sand is indicated by the unconfined compressive strength of the formation. As a general guide, if a formation has an unconfined compressive strength of about 1,100 p.s.i. or greater, sand production is unlikely so sand control measures are not likely to be required. At an unconfined compressive strength of between about 400 and 1,100 p.s.i. sand production may occur and sand control is normally desirable. Below an unconfined compressive strength of about 400 p.s.i. sand control is almost certainly required.

There have been a number of approaches to sand control. These include mechanical approaches that physically prevent sand from entering the produced fluids and the use of chemical methods that bind the sand grains together.

Common approaches to mechanical sand control include gravel packing and the use of screens including pre-packed screens. Gravel packs use gravel (sized sand) placed in the wellbore and physically prevent sand from entering the production stream. A screen is used to prevent gravel production. Gravel packs may be open hole (external gravel pack) or cased hole (internal gravel pack). "Frac-packs" combine cased hole gravel pack and hydraulic fracturing completions and are generally expected to give higher productivity than straight gravel packing. Pre-packed screens are commonly used in horizontal openhole wells and typically consist of a layer of resin-bonded gravel held between two screens. Other types of screen and expandable screens may also be used for mechanical sand control.

Chemical sand control is based on the introduction into the formation of chemicals that bind the sand together. The chemicals increase the strength of the attachments between the sand grains and therefore the tendency for sand production is reduced.

The principle disadvantages of current mechanical approaches to sand control are the cost and the fact that the sand control barrier creates an additional pressure barrier that can reduce the productivity of the well to considerably below its potential. The principle disadvantages of existing chemical approaches to sand control are the cost and health and safety and environmental considerations relating to the types of chemicals that are currently used, which are generally resins such as phenolic resins, furan, furfuryl alcohol and epoxy resins. Resins are often flammable, toxic or hazardous to handle. In addition, the difficulty of treating sections of wellbore which are more than several metres in length make current chemical approaches based on resins generally unsuitable for use in long wellbores. If too much resin is deposited, the formation may be sealed off and not just consolidated. Remedial treatments in a case where too much resin has been deposited are unlikely to be successful.

The use of enzymes to deposit resins or minerals in underground formations has been taught in PCT/GB98/02117. Deposition of the resins or minerals in the formation can result in consolidation. Consolidation using an alkali metal silicate in combination with urea or formamide has been taught in U.S. Pat. No. 5,209,296 and U.S. Pat. No. 5,222,556.

Methods for consolidation based on the use of alkaline solutions in very hot wells have also been taught. A more recent approach has been to use nanoparticles as a means to deliver consolidating materials into the formation (U.S. Pat. No. 6,513,592). Also, consolidation of a formation using resins while drilling has been taught (U.S. Pat. No. 6,702,044).

Current mechanical and chemical approaches to sand control are essentially applied after the well is drilled.

There is a need for further processes for chemical consolidation of a formation that can achieve effective sand control through consolidation of the formation while allowing good production or injection rates to be achieved and which are also low cost, effective, low hazard, easy to apply and may be used on long formation intervals.

The object of the present invention is to provide alternative, non-resin, chemical processes for consolidation of a formation and for sand control.

Another object of the current invention is to provide novel, non-resin, chemical treatment processes whereby long formation intervals, for example horizontal openhole wells, can be consolidated in a simple treatment.

A further object of the current invention is to provide chemical processes of consolidation in which at least some embodiments use chemicals that are low hazard and low toxicity and have low environmental impact.

Yet a further object of the current invention is to provide non-resin chemical processes for achieving consolidation of a formation concomitant with drilling a well through the formation.

Accordingly, the present invention provides a process for consolidating an underground formation which process comprises:

(a) incorporating into a treatment fluid (i) at least one chemical substance which is capable of undergoing a chemical change that alters the physico-chemical environment of the treatment fluid and which is a bicarbonate or a compound that generates a phosphate, phosphoric acid, sulphate, sulphuric acid, hydrogen sulphide, $S^{2-}$, carbon dioxide, bicarbonate, base or acid; and, optionally, (ii) at least one additional chemical substance selected from salts and complexes of metals in which the metal has a valency of 2 or higher;

(b) introducing the treatment fluid into the formation; and (c) allowing the chemical substance (i), alone or in combination with the optional additional chemical substance (ii), to undergo a chemical change that alters the physico-chemical environment of the treatment fluid such that a consolidating mineral is deposited in the underground formation.

At least one of the selected substances (i) incorporated into the treatment fluid is chosen from substances that are capable of undergoing a chemical change to alter the physico-chemical environment of the treatment fluid to a sufficient extent to result in the deposition of a mineral. Normally the chemical change will be hydrolysis or decomposition. Normally, the change in the physico-chemical environment will be a change in the pH and/or the concentration of one or more particular chemical species such as acids, bases, sulphate, bisulphate, phosphate, carbonate, bicarbonate, or carbon dioxide.

Particularly useful as substances (i) in the process of the present invention are soluble bicarbonates, which break down or decompose on heating of the treatment fluid to deposit solid carbonates when suitable metal cations are present. If calcium bicarbonate is used as substance (i) then calcium carbonate can be formed and deposited directly on heating of the solution and no other chemical substances (ii) are required. If using other types of bicarbonate such as sodium hydrogen carbonate ($NaHCO_3$) heating in the presence of divalent (or higher valency) metal ions such as $Ca^{2+}$ will result in the deposition of solid metal carbonates such as calcium carbonate.

Other suitable substances (i) include pH decreasing substances that hydrolyse or decompose to produce basic conditions. Examples of suitable pH decreasing substances include the following: amides including formamide, acetamide. urea and urea derivatives (e.g. 1-methylurea, 1,1-dimethylurea, 1,3-dimethylurea, 1,1,3-trimethylurea, 1-ethylurea, 1,1-diethylurea, 1,3-diethylurea, 1,3-diethylurea, n-propylurea, n-butylurea, 1-phenylurea, 1-methyl-3-phenylurea, 1-ethyl-1-phenylurea) organic azides, cyanic acid, cyanic acid amines (e.g. hexamethyltetraamine, hexamethylenetetramine), tetraazatricycloalkanes and acyl azides (e.g. acetyl azide, propionyl azide, malonyl azide, succinyl azide, phthaloyl azide). Preferred are hexamethyltetraamine, hexamethylenetetramine formamide and urea; most preferred is urea.

Additional substances (i) that are useful in the method of the present invention are those that hydrolyse or decompose to produce phosphoric acid or phosphate (e.g. phosphate esters) sulphuric acid or sulphate (e.g. sulphate esters, sulphamic acid) $H_2S$ or $S^{2-}$ (e.g. thioacetamide, thiourea). It will be understood that the pH at which the hydrolysis takes place will determine the form of the chemical species produced.

Further substances (i) that may be useful in the method of the present invention include carboxylic acid esters that hydrolyse or decompose to produce carboxylic acids.

Suitable other chemical substances (ii) are salts or complexes of metals where the valency of the metal is 2 or higher, or solutions of a silicate, including alkali metal silicates and chemically modified silicates, including organic silicates and silicate esters.

Suitable metals include, but are not limited to, group II metals particularly magnesium, calcium, strontium and barium and transition metals, particularly titanium, vanadium, chromium, manganese, iron, cobalt, nickel, copper, zinc, aluminium and zirconium.

Suitable metal salts include, but are not limited to, chlorides, bromides, fluorides, iodides, oxides, hydroxides, sulphates, phosphates, bicarbonates, acetates and formates. Complexes of metal ions with ligands or chelating agents may also be used.

As a result of the chemical change undergone by the chemical substance or substances (i) a mineral is precipitated out of the treatment fluid as a solid, consolidating material. The consolidating material is preferably deposited on the sand particles and results in an increase in the strength of the formation.

Preferably the mineral is a carbonate, sulphate, phosphate, oxide or sulphide.

All substances present in the treatment fluid will preferably be soluble in water to at least a concentration that will be useful in the process of the present invention (that is, a concentration that will result in a degree of deposition of consolidating material effective for consolidation). In order to facilitate ready penetration into the formation to be consolidated, the treatment fluid will normally be particulate free and low viscosity. There may however be some cases where use of a particulate-containing treatment fluid or a higher viscosity treatment fluid might be beneficial to produce a desired consolidating material (for example for seeding or nucleation purposes or where the process of the present invention is combined with the use of other consolidation processes requiring the use of particulates e.g. nanoparticle based consolidation processes). The use of particulate containing fluids is therefore not excluded from the scope of the present invention.

The treatment may be carried out at any suitable stage during completion or production or injection of the well. The treatment may be carried out on new wells or those that have been already been produced or injected. Optionally the treatment may be applied during drilling.

The treatment formulation is normally mixed at the surface into any suitable water or brine by any method such as will be known to those skilled in the art. Substances will normally be dissolved in water but may if desired be dissolved in water-miscible solvents or dissolved in mixtures of water with water-miscible solvents. The treatment fluid is then placed in the formation using a suitable method such as will be known to those skilled in the art, for example pumping via the drillstring, by bullheading, or by coiled tubing. The well penetrating the formation may be cased and perforated or openhole. In the case of treating formations adjacent to an openhole well, including formations adjacent to a horizontal well, it may be necessary to remove any filter cake present at the formation face (particularly in the case of a newly drilled well) by any suitable method, such as will be known to those skilled in the art, before introducing the treatment fluid, so that the treatment fluid can enter the formation. In the case of treating formations adjacent to a cased and perforated wellbore it may be necessary to remove any damage in the vicinity of the perforations and adjacent filter cake, by any suitable method, such as will be known to those skilled in the art, before introducing the treatment fluid, so that the treatment fluid can enter the formation The fluid is placed sufficiently far into the formation to be treated to give an adequate degree of sand control. The degree of consolidation (formation strengthening) required and the depth to which consolidation is required will be readily determinable by one skilled in the art of designing such treatments. Generally, the degree of strengthening obtained with the treatment fluid formulation to be used on the formation will be determined in a laboratory evaluation ahead of the treatment to assist in design of the treatment. The extent of consolidation may conveniently be investigated by measuring the unconfined compressive strength of the formation with and without treatment, for example using cores cut from the formation.

After placement of the treatment fluid in the formation, the fluid is left for a sufficient period of time for the chemical substance or substances (i) to undergo a chemical change and for the deposition of consolidating material to occur. This will normally take a period of at least a few days (for example between 1 and 5 days) but may take place over a shorter or longer period of time depending on the conditions. The temperature at which the treatment is carried out is a primary determinant of the rate of the hydrolysis and deposition reactions. Normally, consolidation will proceed at the prevailing temperature of the formation. The treatment fluid as introduced will normally (although not in all cases) be at a lower temperature than the formation and will increase in temperature with time. It is well known that the rate of chemical reactions, for example hydrolysis reactions are increased by increasing the temperature. In some situations where the process of the present invention is operated, it may be advantageous to increase the rate at which the process proceeds and deposits a mineral as a consolidant by increasing the temperature of the treatment fluid in the formation adjacent to a wellbore. This may be achieved by supplying heat via the wellbore. Methods of supplying heat include, but are not limited to, injection or circulation of hot water, steam or hydrocarbons through the wellbore, or carrying out exothermic chemical reactions in or adjacent to the wellbore. Suitable methods of providing heat to the wellbore and adjacent formation will be well known to those skilled in the art.

The aim of the process of the present invention is to consolidate the formation to a sufficient extent to provide sand control. The process will increase the unconfined compressive strength of the formation. As a consequence of the deposition of consolidating material, the permeability of the formation will be reduced to at least some extent. The process is normally applied to formations from which it is intended to produce hydrocarbons or water, or to inject hydrocarbons or water, and therefore it is desirable that the formation retains at least sufficient permeability for production or injection to take place. It will be understood by those skilled in the art that deposition of sufficient consolidant in the formation to reduce the permeability to the point at which production or injection could be sealed off could also have oilfield applications. Accordingly, another embodiment of the present invention is to seal off the formation to prevent production or injection. It will be understood that more than one treatment may need to be applied to the formation in order to achieve this.

As normally applied, a relatively slow rate of chemical change in the chemical substances (i) leading to deposition of consolidating material is generally to be preferred as this will facilitate placement of the treatment fluid deep into the formation before any consolidating material is deposited.

Using an adequately mixed treatment fluid, deposition of the consolidating material will take place homogeneously throughout the treatment fluid and therefore throughout the region of the formation into which the treatment fluid has been placed. This will result in uniform consolidation of the formation.

The consolidation treatment may be applied to any poorly consolidated formation with which an individual treatment fluid is compatible. In addition to poorly consolidated sands or sandstones, it will be apparent to those skilled in the art that the process may also be applied to other poorly consolidated zones or formations such as unconsolidated clays, shale or the like. Wells drilled into the consolidated formation may be used for the production or injection of hydrocarbons or water. Consolidation of the formation to a degree sufficient to allow the fracturing of the formation to increase production or injection rates may be possible, if fracturing does not result in production of sand or the like from unconsolidated regions of the formation. The process may also be used to deposit material on surfaces other than sand, sandstone, clays, shale etc. present in the formation. It may be used to deposit consolidant in the gravel or proppant used in frac packs, gravel packs, propped fractures, or the like.

The deposition of consolidating material in the formation increases the amount of cementation or adhesion between the sand grains within the sandstone. Deposition of the mineral consolidating material will generally occur when a critical concentration of the species that react to form the mineral is exceeded under the prevailing conditions of pH, temperature etc. Deposition is favoured at surfaces and at the contact points between sand grains due to surface energy considerations. Deposition of consolidant on the existing cementation on sand grains that are already cemented together will lead to strengthening of the formation. The presence of suitable nucleating materials (either the existing cementation or nucleating materials incorporated into the treatment fluid or introduced into the formation ahead of the treatment fluid to adsorb onto the existing formation or cementation) may also assist in ensuring deposition takes place on the existing cementation. Suitable nucleating materials will be any material that preferentially binds or associates to the particles or cementation already present in the formation, and which acts as a nucleating material for consolidants of the present invention. Suitable nucleating materials include, but are not limited to, polymers such as polysaccharides and proteins and microparticles (micro-crystals) of the consolidant being deposited. Suitable effective materials will be known to those skilled in the art. The effectiveness of different materials will be readily determinable by suitable tests.

Where the consolidant that is deposited is essentially the same mineral as the existing cementation or nucleating material, deposition will be particularly favoured. For example, where calcium carbonate is deposited as a consolidant, the presence of existing calcium carbonate in the cementation is expected to provide an excellent surface for nucleation and deposition of the new calcium carbonate.

In some situations, it may be useful to incorporate materials that have the opposite effect to nucleating agents, i.e. act as delaying agents which inhibit, modify or regulate the deposition of the consolidating material to at least some extent. These may be any materials that prevent, slow, modify or inhibit deposition of the consolidating mineral at the concentration at which they are used.

Particularly useful will be scale inhibitors, such as will be known to those skilled in the art and which are generally used to prevent deposition of oilfield scales.

Many known scale inhibitors are proprietary chemicals are generally composed of materials which fall into one of three chemical classes: (1) low molecular weight polycarboxylates, including polyacrylates and polymaleates; (2) inorganic polyphosphates and phosphate esters; and (3) phosphonates. Each class has properties which make certain materials desirable depending on the specific conditions.

Suitable scale inhibitors include, but are not limited to, inorganic polyphosphates, phosphate esters, sulfonates, phosphonates, polycarboxylates (including polyacrylates and polymaleates) copolymers and terpolymers of acrylates, sulfonates and phosphonates, polyphosphino-carboxylic acids, phosphino polycarboxylic acids and mixtures thereof. Examples of such scale inhibitors are described in US20030150613A1, US20040154799A1 and U.S. Pat. No. 5,655,601.

Introduction of such materials into the formation ahead of, or contained in the treatment fluid, may retard deposition of consolidant and allow consolidation deeper into the formation. In the case of scale inhibitors, dilution of the scale inhibitor to below the minimum inhibitory concentration (MIC) will generally be needed in order for mineral deposition to occur.

In general, use of treatment formulations that deposit consolidant at a slow rate is preferred as this is more likely to result in effective consolidation. Effective consolidation will reduce the permeability of the formation to some extent but this is an acceptable trade off if the treatment results in strengthening of the formation. Deposition of consolidant from the treatment fluid at too rapid a rate may result in the deposition of discrete mineral particles in the treatment fluid, which could potentially block pore throats and substantially reduce the permeability of the formation but without giving the same degree of strengthening obtained from a slower deposition at surfaces. Operation of the process in such a manner may therefore result in blocking of pore throats leading to sealing off of the formation.

In a further aspect of the invention as described above, the treatment fluid may optionally be used as a drilling fluid (or drilling mud or drill-in fluid) that can achieve consolidation. In such an embodiment it is necessary that the treatment fluid will also fulfill the requirements of a drilling fluid.

The present invention therefore further provides a process for consolidating an underground formation during drilling, which process comprises:
 (a) incorporating into a treatment fluid (i) at least one chemical substance which is capable of undergoing a chemical change that alters the physico-chemical environment of the treatment fluid and which is a bicarbonate or a compound that generates a phosphate, phosphoric acid, sulphate, sulphuric acid, hydrogen sulphide, $S^{2-}$, carbon dioxide, bicarbonate, base or acid; and, optionally, (ii) at least one additional chemical substance selected from salts and complexes of metals in which the metal has a valency of 2 or higher, and silicates;
 (b) drilling a well with the treatment fluid such that at least a portion of the treatment fluid enters the formation; and
 (c) allowing the chemical substance (i), alone or in combination with the optional additional chemical substance (ii), to undergo a chemical change that alters the physico-chemical environment of the treatment fluid such that a consolidating mineral is deposited in the underground formation.

Required functions of a drilling fluid include: control of formation pressure; lubrication of the drill string; cooling of the drill bit; suspension of solids under static and dynamic conditions and the removal of drilled cuttings from the hole. The term drilling should be taken to include under-reaming and similar operations. In this further embodiment of the present invention substances (i) and (ii) will enter the formation during drilling as part of the fluid spurt loss that occurs as a filter cake is deposited on the inside of the wellbore. A drilling fluid is normally formulated to minimise the loss of fluid to the formation, by incorporating particulate materials into the fluid which, in combination with fines generated during the drilling process and viscosifying polymers (if present) contribute to the build up of a filter cake. Fluid spurt loss is that loss of fluid to the formation, which takes place as the filter cake builds up.

However, in the case of the present invention it is generally advantageous to formulate the treatment fluid used as a drilling fluid to give a larger spurt loss than is normally obtained and therefore obtain consolidation around the wellbore to a greater depth than would otherwise be the case. Accordingly, it will not generally be desirable to incorporate particulate materials into treatment fluids used as drilling fluids in the present invention, or to use only low concentrations of particulate materials or particles of such a size that a large spurt loss occurs.

High loadings of particulate materials are intended to reduce the spurt loss and low or zero loadings will increase the spurt loss. Filtrate is estimated to penetrate into the formation to depths of 30 to 60 cm even in the case of normally formulated drilling muds, although the penetration of particulates is generally much less than this. With drilling fluids formulated to give high spurt losses deeper penetration is likely. After deposition of the filter cake, some further fluid loss to the formation may occur but this is likely to be limited.

The treatment fluid used as a drilling fluid will be prepared at the surface, generally in the mud pits, by any method which would be known to those skilled in the art. If the rate of chemical change of substance (i) is sufficiently slow, both substance(s) (i) and optionally substance(s) (ii) may be incorporated directly into the treatment fluid used as a drilling fluid. Alternatively if the rate of chemical change of substance (i) is fast enough to result in unacceptable levels of the consolidating material being deposited in the bulk drilling fluid, one or more of substances (i) or (ii) may be introduced and mixed into the drilling fluid lower down the drilling assembly, so that more of the consolidating material is produced in the formation after spurt loss has taken place. Introduction and mixing into the drilling fluid lower down the drilling assembly may be achieved by any method that is known to those skilled in the art.

During drilling, using treatment fluids formulated as drilling fluids according to the process of the present invention, it will generably be desirable to monitor the composition of the treatment fluid to measure the concentrations of any chemical substance(s) (i) which can undergo a chemical change, suitable other chemical substance(s) (ii) and any nucleation material(s) or delaying substances incorporated into the treatment fluid. After formulating a treatment fluid as a drilling fluid and during drilling, some consolidant may be deposited within the drilling fluid. Any solid materials produced within the bulk treatment fluid during drilling will remain as part of the drilling fluid or be deposited as part of the filter cake. Deposition of consolidant in the treatment fluid will reduce the concentration of those consolidant forming chemicals within the bulk treatment fluid and therefore their concentration in the fluid spurt loss. The monitoring of individual chemicals in the bulk treatment fluid will indicate what chemicals might need to have their concentration increased (or where the pH is important in achieving consolidation what pH adjustment may be needed) in order to maintain the effectiveness of the treatment fluid that will deposit the required amount of consolidant in the formation. Methods of monitoring and replacement of chemicals consumed in the reaction will be such methods as are generally well known to those skilled in the art.

Silicate fluids are particularly suitable when using treatment fluids of the present invention as a drilling fluid. Silicate drill-in fluids and the like are already extensively used in the drilling of wells.

The deposition of mineral onto the sand grains increases the amount of cementing materials and therefore the unconfined compressive strength of the formation. Following consolidation of the formation, wells penetrating the formation may if desired be put on production or injection.

The deposited consolidant will normally have a low solubility in water so that the consolidant is not dissolved by water leading to a reduction in the amount of consolidant and a reduction in the strength of the formation. If dissolution of the consolidant occurs at a higher than desirable rate, as determined by laboratory or field determinations, re-consolidation of the formation using more treatment fluid may be required.

Normally, all substances used in the process of the present invention will be technical grade to reduce the cost of the process.

Suitable concentrations of substances used in the process of the present invention will depend on the required amount of consolidant to be deposited in the formation. This will depend on the particular combination of substances chosen but will typically be of the order of 1 to 200 grams per litre (preferably 10 to 100 grams per litre) although higher or lower concentrations may be appropriate in some situations. Added nucleating materials or scaling modifiers regulators or inhibitors will be used at a suitable concentration to give the desired effect and suitable concentrations will be understood by those skilled in the art or may be readily determined by suitable laboratory evaluations.

Some mixing of reservoir fluids and treatment fluid will occur in the formation. Possible dilution of the concentration of the chemical species in the treatment is therefore expected to occur and the initial concentration of these chemical species may be increased to compensate for the expected dilution. However, in many cases the formation water will contain appreciable concentrations of a chemical species that may be useful in the process of the present invention and this will also be taken into account by persons designing the treatments and skilled in the art. For example, there is frequently a high concentration of soluble calcium in many formation waters. Mixing and dilution may be beneficial when scale inhibitors or the like are used to inhibit, modify or regulate the deposition of the consolidating material and dilution of the delaying agent to below a critical concentration is needed.

More than one substance (i) or combination of substance(s) (i) and (ii) may be used in the treatment fluid which may lead to the deposition of more than one type of material in the formation.

The process of the present invention may be applied to any well drilled into an underground formation but is particularly intended for use in poorly consolidated formations. Types of well may include vertical, deviated, inclined or horizontal wells. The wells may be cased and perforated, openhole, or completed using any other recognised type of completion.

The process of the present invention may, if desired, be used in conjunction with mechanical and/or other chemical methods of sand control such as will be known to those skilled in the art. The process may be used before, after or at the same time as the other methods of sand control as is appropriate for the particular case.

Where a formation is sensitive to, and may be damaged by introduced fluids this will generally be taken into account in formulating treatment fluids of the present invention. For example, where clay swelling is a problem, chelating compounds such as citric acid or EDTA may be incorporated in the fluid to inhibit the swelling. Other chemicals such as $CaCl_2$ and $AlCl_3$ may also act as inhibitors to some extent. Such inhibitors may be incorporated into treatment fluids of the present invention and may also function as other substances (ii) in the method of the present invention.

The process as generally operated involves the deposition of consolidant from an aqueous solution onto a water-wet surface. It may therefore be beneficial to treat the formation ahead of a treatment with any agents that are commonly used to remove hydrocarbons from the formation surfaces in the zone of the formation to be consolidated leaving a water-wet surface. Agents that can achieve this include, but are not limited to, solvents, mutual solvents and surfactants. Suitable agents may also be incorporated into the treatment fluid if compatible. Other additives that may be useful in the process of the present invention include viscosity reducing agents and fines suspenders but any other additives that are recognised as providing a benefit to the treatment by those skilled in the art may also be used. Such additives or chemicals may be introduced ahead of the treatment fluid, incorporated into the treatment fluid, or used after the treatment fluid.

Consolidants that are particularly useful to deposit using the process of the present invention include minerals of the type that are typically present as cementing material in sandstone formations (for example calcium carbonate or calcium magnesium carbonate) or which are found in oilfield scales (for example barium sulphate). Typically, such minerals are low solubility and will dissolve from the formation at a negligible or acceptably low rate during injection or production operations.

The invention is further illustrated in the following examples.

EXAMPLE 1

Deposition of Calcium Carbonate

A treatment fluid containing calcium bicarbonate is introduced into a formation at a temperature of about 100 degrees C. or higher. On heating the bicarbonate solution yields calcium carbonate.

$$Ca(HCO_3)_{2(aq)} + heat \rightarrow CaCO_{3(s)} + H_2O + CO_2.$$

EXAMPLE 2

Deposition of Calcium Carbonate

A treatment fluid containing calcium chloride and urea is introduced into a formation at a temperature of about 80 degrees C. or higher. On hydrolysis of the urea, carbon dioxide and ammonia are produced. At alkaline pH, the carbon dioxide reacts with the calcium ions to deposit calcium carbonate.

EXAMPLE 3

Deposition of Barium Sulphate

A treatment fluid containing barium chloride and sulphamic acid is introduced into a formation at a temperature of about 90 degrees C. or higher. On hydrolysis of the sulphamic acid, sulphate is liberated which reacts with the barium ions to deposit barium sulphate.

EXAMPLE 4

Deposition of Zinc Sulphide

A treatment fluid containing a zinc salt and thioacetamide is introduced into a formation at a temperature of about 80 degrees C. or higher. The thiacetamide is hydrolysed to produce $S_2^-$ resulting in the deposition of zinc sulphide.

EXAMPLE 5

Deposition of Titanium Dioxide

A treatment fluid containing titanium sulphate and urea is introduced into a formation at a temperature of about 100 degrees C. As the urea is hydrolysed the titanium is deposited as titanium dioxide.

EXAMPLE 6

Deposition of Calcium Phosphate

A treatment fluid containing calcium chloride plus sodium glycerophosphate is introduced into a formation and heated to 60 degrees C. or higher. The glycerophosphate hydrolyses to produce phosphate, which reacts with the calcium to deposit calcium phosphate.

EXAMPLE 7

Deposition of Calcium Phosphate

A treatment fluid containing calcium glycerophosphate is introduced into a formation and heated to 60 degrees C. or higher. The glycerophosphate hydrolyses to produce phosphate, which reacts with the calcium to deposit calcium phosphate.

EXAMPLE 8

Deposition of Silicate

A treatment fluid containing 8.3% w/v $K_2O$ and 20.8% w/v $SiO_2$ is mixed with 30% urea and introduced into a formation at a temperature of 55 degrees C. or higher. As the urea is hydrolysed a white silicate consolidant is produced, sometimes preceded by formation of a clear gel (without being held to a particular mechanism, this is believed to be the formation of colloidal silicates which eventually become crystalline).

EXAMPLE 9

Deposition of Silicate

A treatment fluid containing 8.3% w/v $K_2O$ and 20.8% w/v $SiO_2$ is mixed with 10% formamide and introduced into a formation at a temperature of 40 degrees C. or higher. As the urea is hydrolysed a white silicate consolidant is produced, sometimes preceded by formation of a clear gel.

The above examples are for illustration only and are not for the purpose of limiting the scope of the present invention. It will be understood by those skilled in the art that other metals and salts of those metals given as examples above may be used. Similarly, a large number of compound that undergo a chemical change to give a change in the physico-chemical conditions leading to the deposition of a consolidant may be used. All such variations are within the scope of the present invention.

The invention claimed is:

1. A process for consolidating an underground formation, which process comprises:
   (a) incorporating into a treatment fluid (i) at least one chemical substance which is a compound that generates a sulphate or a sulphuric acid; and, optionally, (ii) at least one additional chemical substance selected from salts and complexes of metals in which the metal has a valency of 2 or higher;
   (b) introducing the treatment fluid into the formation; and
   (c) allowing the chemical substance (i), alone or in combination with the optional additional chemical substance (ii), to undergo a chemical change that produces a consolidating mineral that is deposited in the underground formation, wherein the mineral is a sulphate.

2. A process according to claim 1 wherein said chemical substance is a sulphate ester or sulphamic acid.

3. A process according to claim 1 wherein the salt of a metal having a valency of 2 or higher is a salt of a group II metal or a transition metal.

4. A process according to claim 3 wherein the salt is a chloride, bromide, fluoride, iodide, oxide, hydroxide, sulphate, phosphate, bicarbonate, acetate or formate.

5. A process according to claim 1 wherein the complex of a metal having a valency of 2 or more is the complex of a metal ion with a ligand or chelating agent.

6. A process according to claim 1 wherein the salt of a metal having a valency of 2 or higher is a salt of magnesium, calcium, strontium, barium, titanium, vanadium, chromium, manganese, iron, cobalt, nickel, copper, zinc, aluminium or zirconium.

7. A process according to claim 1 wherein the treatment fluid is used as a drilling fluid.

8. A process according to claim 7 wherein the treatment fluid achieves consolidation of the formation during or following drilling.

9. A process according to claim 1 wherein the mineral that is deposited consolidates the formation.

10. A process according to claim 7 wherein a bicarbonate is present in the treatment fluid.

11. A process according to claim 1 wherein heat is supplied via the wellbore to accelerate the process of consolidation of the formation.

12. A process according to claim 1 wherein a nucleating material is introduced into the formation ahead of or in conjunction with the treatment fluid.

13. A process according to claim 1 wherein a delaying agent is introduced into the formation ahead of or in conjunction with the treatment fluid.

14. A process according to claim 1 wherein a water wetting agent is introduced into the formation ahead of or in conjunction with the treatment fluid.

15. A process according to claim 1 wherein the formation is sealed off to production or injection.

16. A process according to claim 1 wherein the consolidating mineral deposited in the underground formation in step (c) serves to consolidate the formation to a sufficient extent to provide sand control.

17. A process according to claim 1 wherein the consolidating mineral deposited in step (c) serves to seal off the formation to prevent production or injection, optionally via more than one treatment.

* * * * *